(12) United States Patent
Koshihara

(10) Patent No.: US 10,852,626 B2
(45) Date of Patent: Dec. 1, 2020

(54) OPTICAL MODULE AND HEAD-MOUNTED DISPLAY APPARATUS

(71) Applicant: SEIKO EPSON CORPORATION, Tokyo (JP)

(72) Inventor: Takeshi Koshihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/596,810

(22) Filed: Oct. 9, 2019

(65) Prior Publication Data

US 2020/0117075 A1    Apr. 16, 2020

(30) Foreign Application Priority Data

Oct. 10, 2018  (JP) .................. 2018-191893

(51) Int. Cl.
| | | |
|---|---|---|
| *G02B 27/01* | (2006.01) | |
| *G03B 21/10* | (2006.01) | |
| *G03B 21/28* | (2006.01) | |

(52) U.S. Cl.
CPC ......... *G03B 21/10* (2013.01); *G02B 27/0172* (2013.01); *G03B 21/28* (2013.01); *G02B 2027/0114* (2013.01); *G02B 2027/0178* (2013.01)

(58) Field of Classification Search
CPC ...... G03B 21/10; G03B 21/28; G03B 21/142; G02B 27/0172; G02B 2027/0114; G02B 2027/0178; G02B 17/086; G02B 27/149
See application file for complete search history.

(56) References Cited

U.S. PATENT DOCUMENTS

| | | | | |
|---|---|---|---|---|
| 5,624,174 | A * | 4/1997 | Loucks | G02B 27/1073 348/E9.027 |
| 7,502,078 | B2 * | 3/2009 | Suzuki | H04N 9/3105 349/5 |
| 8,480,239 | B2 * | 7/2013 | Sato | G03B 21/14 353/99 |
| 10,075,682 | B2 * | 9/2018 | Ando | H04N 9/31 |
| 10,712,775 | B2 * | 7/2020 | Richards | G06F 1/163 |
| 2004/0239895 | A1 | 12/2004 | Inamoto | |
| 2013/0271673 | A1 * | 10/2013 | Katou | G03B 33/12 348/744 |

FOREIGN PATENT DOCUMENTS

| | | |
|---|---|---|
| JP | H11-249070 A | 9/1999 |
| JP | 2002-107820 A | 4/2002 |
| JP | 2004-354437 A | 12/2004 |

* cited by examiner

*Primary Examiner* — Bryan Earles
(74) *Attorney, Agent, or Firm* — Oliff PLC

(57) ABSTRACT

An optical module in the present disclosure includes a first image display panel including a first display part and a first coupling part, a second image display panel including a second display part and a second coupling part, a third image display panel including a third display part and a third coupling part, and a cross dichroic prism configured to synthesize first, second, and third image light. The cross dichroic prism has a cross axis at which a two of photosynthesis surfaces cross each other. The first, second, and third image display panel are respectively bonded to different surfaces of the cross dichroic prism in a state where a long side of each of the first, second, and third display part extends along the cross axis and where the first, second, and third coupling part are each positioned on an outer side of the cross dichroic prism.

8 Claims, 9 Drawing Sheets

OPTICAL MODULE AND HEAD-MOUNTED DISPLAY APPARATUS

The present application is based on, and claims priority from JP Application Serial Number 2018-191893, filed Oct. 10, 2018, the disclosure of which is hereby incorporated by reference herein in its entirety.

BACKGROUND

1. Technical Field

The present disclosure relates to an optical module and a head-mounted display apparatus.

2. Related Art

Hitherto, as an optical module that synthesizes image light of respective colors RGB emitted from three display panels, a technology in which a cross dichroic prism and three display panels are combined has been known (for example, see JP-A-2004-354437). Such optical module is mounted to a display apparatus. However, in recent years, there has been a strong demand to reduce a size of the display apparatus, and a space to which the optical module is mounted is limited.

Because of the limitation of the space to which the optical module is mounted, further reduction in dimension of the optical module in a predetermined direction is demanded, but the related-art optical module described above cannot achieve sufficient reduction in size.

SUMMARY

In order to solve the above-mentioned problem, according to one aspect of the present disclosure, an optical module includes a first image display panel including a first display part, which has a rectangular shape, and a first coupling part, a second image display panel including a second display part, which has a rectangular shape, and a second coupling part, a third image display panel including a third display part, which has a rectangular shape, and a third coupling part, and a cross dichroic prism including a two of photosynthesis surfaces, and configured to synthesize first image light emitted from the first image display panel, second image light emitted from the second image display panel, and third image light emitted from the third image display panel. The cross dichroic prism has a cross axis at which the two of photosynthesis surfaces cross with each other. The first image display panel, the second image display panel, and the third image display panel are respectively bonded to different surfaces of the cross dichroic prism in a state where a long side of each of the first display part, the second display part, and the third display part extends along the cross axis and the first coupling part, the second coupling part, and the third coupling part are each positioned on an outer side of the cross dichroic prism.

In the optical module according to one aspect of the present disclosure, the first image display panel and the third image display panel may be arranged to face each other, and when viewed from a direction along the cross axis in plan view, the first image display panel may be provided to extend to one side of the cross dichroic prism along a light emitting direction of the cross dichroic prism, and the third image display panel may be provided to extend to the other side in the light emitting direction.

In the optical module according to one aspect of the present disclosure, the first image display panel and the third image display panel may be arranged to face with each other, and when viewed from a direction along the cross axis in plan view, the first image display panel and the third image display panel may each be provided to extend to in the light emitting direction of the cross dichroic prism.

In the optical module according to one aspect of the present disclosure, the first image display panel may further include a first drive circuit part configured to drive the first display part, the second image display panel may further include a second drive circuit part configured to drive the second display part, and the third image display panel may further include a third drive circuit part configured to drive the third display part, and the first image display panel, the second image display panel, and the third image display panel may be respectively bonded to different surfaces of the cross dichroic prism in a state where the first drive circuit part, the second drive circuit part, and the third drive circuit part are each positioned on the outer side of the cross dichroic prism.

In the optical module according to one aspect of the present disclosure, the plurality of image display panels may include a light emitting panel. Further, the light emitting panel may be an organic EL panel.

According to another aspect of the present disclosure, a head-mounted display apparatus includes the optical module according to one aspect of the present disclosure, and a projection optical system configured to project light from the optical module to an eye of an observer.

DESCRIPTION OF EXEMPLARY EMBODIMENTS

Figure 1:
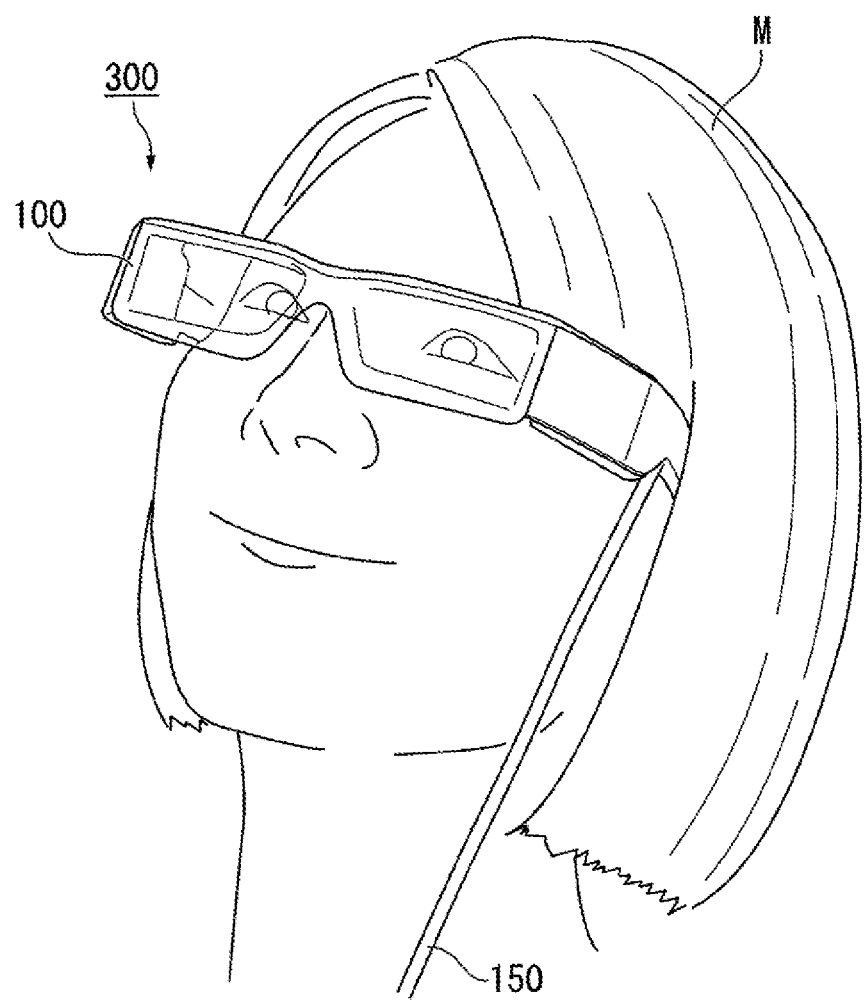
FIG. 1 is a diagram for illustrating a state in which an observer wears an HMD according to a first exemplary embodiment.

Exemplary embodiments of the present disclosure will be described in detail below with reference to the accompanying drawings. Note that, in the drawings used for the following descriptions, characteristic portions are expanded for convenience to make characteristics easily comprehensible in some cases, thus dimension ratios among respective constituent elements or the like are not necessarily the same as actual dimension ratios.

First Embodiment

A head-mounted display apparatus according to the present exemplary embodiment is an example of a head-mount display used by being mounted on a head of an observer. In the description below, the term "Head Mounted Display" is abbreviated as "HMD".

Figure 2:
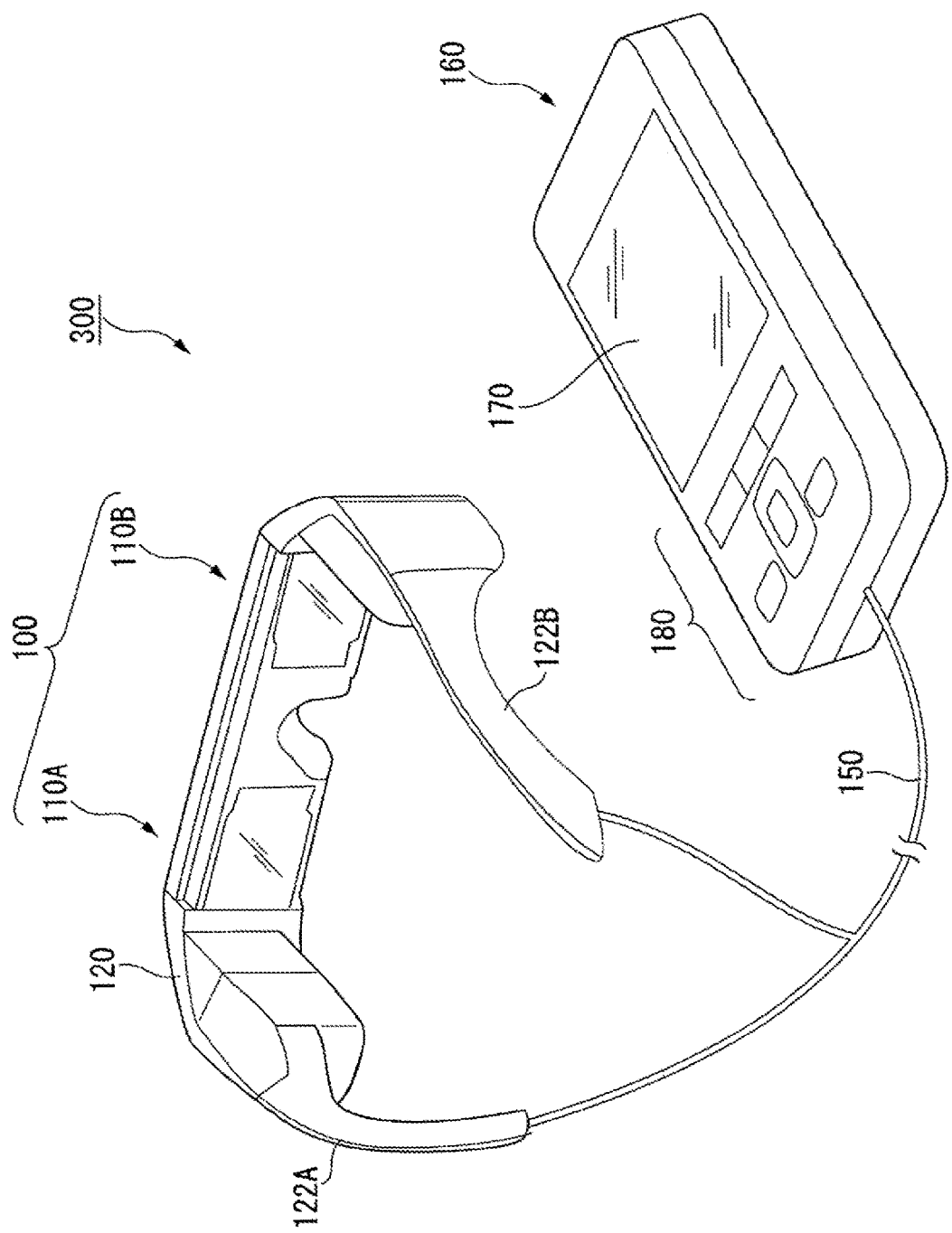
FIG. 2 is a perspective view of the HMD according to the first exemplary embodiment.

FIG. 1 is a diagram for illustrating a state in which the observer wears the HMD according to this exemplary embodiment. FIG. 2 is a perspective view of the HMD according to this exemplary embodiment.

As illustrated in FIG. 1, the HMD (head-mounted display apparatus) 300 according to the present exemplary embodiment is used by being mounted on the head of the observer as in a case of wearing glasses. The HMD 300 according to this exemplary embodiment is a see-through type HMD. With the HMD 300 according to this exemplary embodiment, the observer can visually recognize an image generated by an image display unit.

As illustrated in FIG. 2, the HMD 300 includes a display unit 100 having a glasses-like shape, and a control unit (controller) 160 having a size small enough for the observer to be capable of holding with a hand. The display unit 100 and the control unit 160 are communicatively connected with each other, by wire, or wireless. In this exemplary embodiment, each of a left-eye image display unit 110A and a right-eye image display unit 110B forming the display unit 100, and the control unit 160 are communicatively connected by wire via a cable 150, and communicate an image signal, a control signal, or the like.

The display unit 100 includes a main frame (device main body) 120, the left-eye image display unit 110A, and right-eye image display unit 110B. The control unit 160 includes a display panel unit 170, and an operation button unit 180.

For example, the display panel unit 170 displays various types of information, instructions, or the like to give to the observer. The main frame 120 includes a pair of temple portions 122A and 122B to hang on ears of the observer. The main frame 120 is a member for supporting the left-eye image display unit 110A and the right-eye image display unit 110B.

The right-eye image display unit 110B and the left-eye image display unit 110A have similar configurations, and the constituent elements inside both the image display units are symmetrically arranged. Thus, in the following, the left-eye image display unit 110A is described simply as an image display unit 110 in detail, and description of the right-eye image display unit 110B is omitted.

Figure 3:
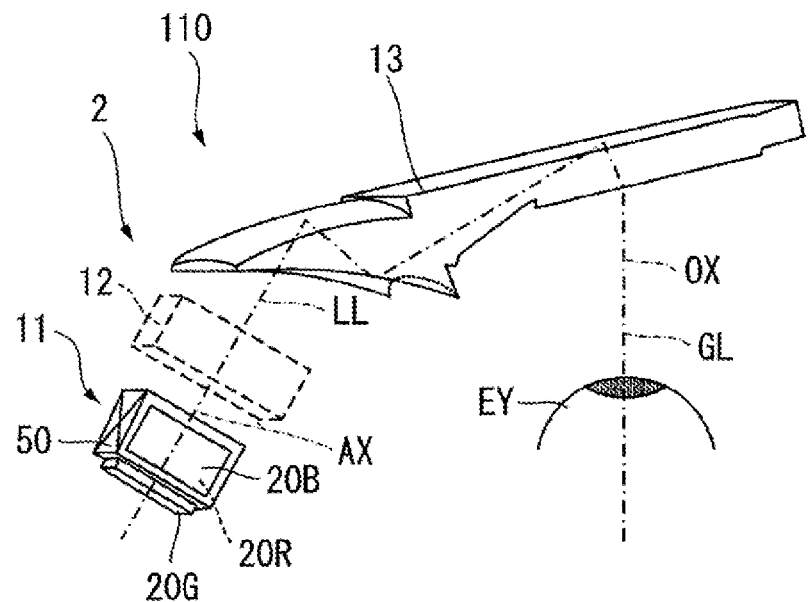
FIG. 3 is a diagram for illustrating a configuration of respective components of an image display unit.

FIG. 3 is a diagram for illustrating a configuration of respective components of the image display unit. Further, in FIG. 3, an eye EY of the observer wearing the image display unit 110 is illustrated. Note that, in FIG. 3, a path passing through the center of a pupil of the eye EY of the observer M and through which a light beam forming a central angle of view of an observed image passes is defined as an optical axis AX.

As illustrated in FIG. 3, the image display unit 110 includes an image generating unit (optical module) 11, a projection optical system 12, and a light-guiding optical system 13. The image display unit 110 is modulized by incorporating the image generating unit 11, the projection optical system 12, and the light-guiding optical system 13 in a casing (not illustrated). Note that, in FIG. 3, image light LL passing over the optical axis AX of the projection optical system 12 is illustrated. Note that, in FIG. 3, the projection optical system 12 is schematically and abstractly illustrated, but is formed of a single lens or a group of a plurality of lenses.

The image generating unit 11 includes a first image display panel 20R, a second image display panel 20G, a third image display panel 20B, and a cross dichroic prism 50.

In this exemplary embodiment, each of the first image display panel 20R, the second image display panel 20G, and the third image display panel 20B is a light emitting panel.

In this exemplary embodiment, an organic EL panel is used as a light emitting panel. By using an organic EL panel as a light emitting panel, a member in which even a light source is integrated can be obtained. Thus, the first image display panel 20R, the second image display panel 20G, and the third image display panel 20B can be reduced in size and weight. Note that, the first image display panel 20R, the second image display panel 20G, and the third image display panel 20B have similar configurations except that a wavelength range of emitted light is different as described below.

Here, a configuration of the first image display panel 20R is described.

Figure 4:
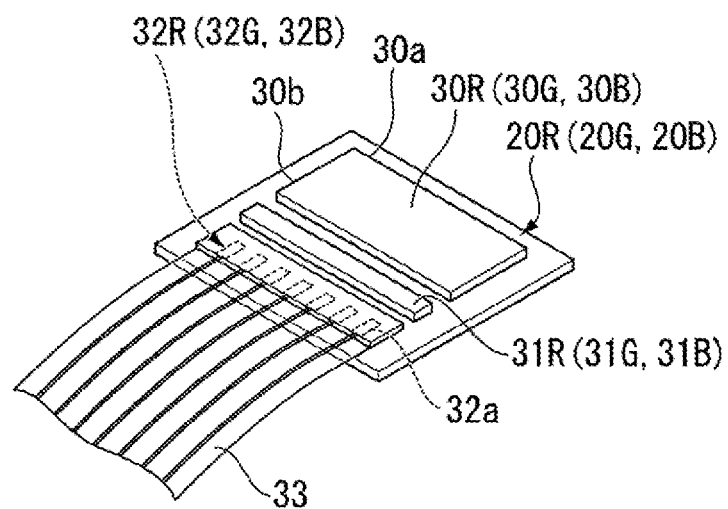
FIG. 4 is a perspective view for illustrating a configuration of a first image display panel.

FIG. 4 is a perspective view for illustrating a configuration of the first image display panel.

As illustrated in FIG. 4, the first image display panel 20R includes a first display part 30R, a first drive circuit part 31R, and a first coupling part 32R.

The first display part 30R is formed by arraying pixels, which are formed of organic EL elements emitting red light, in a matrix. The first display part 30R emits red image light of a red wavelength range (for example, from 620 nm to 750 nm). The first display part 30R is formed into a rectangle having a long side 30a and a short side 30b as an entire plane shape. The first display part 30R generates desired red image light by driving a plurality of pixels.

The first drive circuit part 31R includes, for example, a scanning line drive circuit and a data line drive circuit, and drives the first display part 30R by being electrically coupled to the pixels forming the first display part 30R. The first coupling part 32R includes a plurality of mounting terminals 32a, and an exterior coupling substrate 33 such as a flexible wiring substrate is coupled to the plurality of mounting terminals 32a.

The first image display panel 20R transmits and receives a signal to the outside via the first exterior coupling substrate 33R. That is, the first coupling part 32R functions as an interface part that transmits and receives a signal between the first image display panel 20R and the outside.

Based on such configuration, the first image display panel 20R transmits a signal, which is input from the outside, from the first coupling part 32R to the drive circuit part 31R. Further, the drive circuit part 31R generates the desired red image light by driving the first display part 30R.

The second image display panel 20G and the third image display panel 20B have similar configurations to that of the first image display panel 20R. The second image display panel 20G includes a second display part 30G, a second drive circuit part 31G, and a second coupling part 32G, and generates and emits green image light of a green wavelength range (for example, from 495 nm to 570 nm). The third image display panel 20B includes a third display part 30B, a third drive circuit part 31B, and a third coupling part 32B, and generates and emits blue image light of a blue wavelength range (for example, 450 nm to 495 nm).

In the following, when the first display part 30R, and the second display part 30G, the third display part 30B is not particularly distinguished, "display part 30" is simply given. Further, when the first drive circuit part 31R, the second drive circuit part 31G, and the third drive circuit part 31B are not particularly distinguished, "drive circuit part 31" is simply given. Further, when the first coupling part 32R, the second coupling part 32G, and the third coupling part 32B are not particularly distinguished, "coupling part 32" is simply given.

Note that, in each of the image display panels 20R, 20G, and 20B, the drive circuit part 31 and the coupling part 32 are arranged along the short side 30b of the display part 30. Thus, in the first image display panel 20R, the drive circuit part 31 and the coupling part 32 are not arranged in a direction along the long side 30a of the display part 30. With this, a width of each of the image display panels 20R, 20G, and 20B is suppressed to a length equivalent to the long side 30a of the display part 30.

Note that, the red image light, the green image light, and the blue image light described above is unpolarized light without a polarization property. This is because the red image light, the green image light, and the blue image light are emitted from organic molecules arranged randomly in an organic thin film, do not have a polarization property unlike a liquid crystal display, and basically have a unpolarized lumination property.

Figure 5:
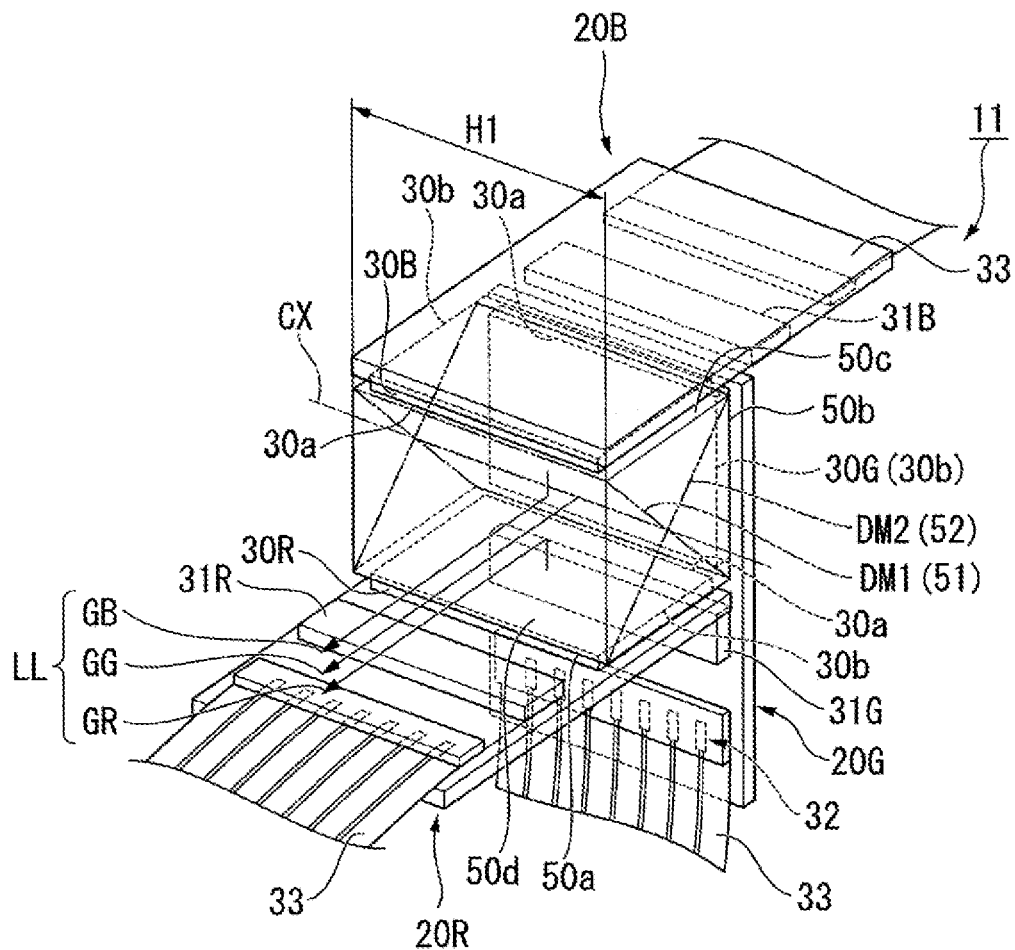
FIG. 5 is a perspective view for illustrating a configuration of an image generating unit.

FIG. 5 is a perspective view for illustrating a configuration of the image generating unit.

As illustrated in FIG. 5, the cross dichroic prism 50 being a constituent member of the image generating unit 11 is a member having a rectangular columnar shape formed by bonding four triangular prism-shaped prism member s formed of a transmissive material such as glass. Specifically, the four triangular prism-shaped prism members have a congruent shape, and have a bottom surface formed into an isosceles right triangle. The quadrangular prism-shaped member is formed by attaching together the side surfaces of the four triangular prism-shaped prism members so that the vertexes of the right-angled section of the bottom surface are aligned. In this case, the ridges along the vertexes of the bottom surface overlap each other, and a single cross axis is formed. A first photosynthesis surface 51 and a second photosynthesis surface 52 crossing each other are formed on the bonded part being the side surfaces of the triangular prism-shaped prism members.

The cross dichroic prism 50 in this exemplary embodiment includes a first surface 50a for bonding the first image display panel 20R, a second surface 50b for bonding the second image display panel 20G, and a third surface 50c for bonding the third image display panel 20B, and a light emitting surface 50d for emitting synthesized light.

That is, the first image display panel 20R, the second image display panel 20G, and the third image display panel 20B are bonded to different surfaces of the cross dichroic prism 50. The first surface 50a, the second surface 50b, the third surface 50c, and the light emitting surface 50d are formed of four surfaces of the six surfaces of the cross dichroic prism 50, which do not cross with a cross axis CX. Further, the first surface 50a, the second surface 50b, the third surface 50c, and the light emitting surface 50d have the same shape.

The first surface 50a functions as a light incident surface for taking red image light GR, which is emitted from the first image display panel 20R, into the prism. The second surface 50b functions as a light incident surface for taking the green image light GG, which is emitted from the second image display panel 20G, into the prism. The third surface 50c functions as a light incident surface for taking in blue image light GB, which is emitted from the third image display panel 20B.

A first dichroic film DM1 formed of, for example, a dielectric multilayer film, is provided to the first photosynthesis surface 51. The first dichroic film DM1 transmits the green image light GG, which is emitted from the second image display panel 20G, and the blue image light GB, which is emitted from the third image display panel 20B, and reflects the red image light GR, emitted from the first image display panel 20R, in the same direction as a proceeding direction of the green image light GG.

A second dichroic film DM2 formed of, for example, a dielectric multilayer film, is provided to the second photosynthesis surface 52. The second dichroic film DM2 transmits the red image light GR, which is emitted from the first image display panel 20R, and the green image light GG, which is transmitted from the second image display panel 20G, and reflects the blue image light GB, which is emitted from the third image display panel 20B, in the same direction as a proceeding direction of the green image light GG.

Note that, in the following, when the first dichroic film DM1 and the second dichroic film DM2 are not particularly distinguished, those are collectively referred to as the dichroic films DM1 and DM2.

The dichroic films DM1 and DM2 are arranged so as to be inclined at 45 degrees with respect to the first surface 50a, the second surface 50b, and the third surface 50c and to cross with each other at 90 degrees. Here, the single cross axis formed by overlapping of the ridges along the vertexes of the bottom surfaces of the triangular prism-shaped prism members, that is, the cross axis formed by the intersection of the first dichroic film DM1 and the second dichroic film DM2 is referred to as the cross axis CX.

Based on such configuration, the cross dichroic prism 50 in this exemplary embodiment emits a full-color image light LL from the light emitting surface 50d by synthesizing the red image light GR, the green image light GG, and the blue image light GB, which enter the inside, in the dichroic films DM1 and DM2.

In the following, in the description for the image generating unit 11, an XYZ coordinate system is used for easy understanding of an arrangement relationship of the respective members.

Specifically, in the image generating unit 11, a direction in which the cross axis CX extends is referred to as a Y direction and a direction in which the image light LL is emitted is referred to as a Z direction. Note that, a direction perpendicular to the Y direction and the Z direction for a right-handed system with respect to the Y direction and the Z direction specified as above is referred to as an X direction.

The first display part 30R is bonded to the first surface 50a so that the first image display panel 20R is held by the cross dichroic prism 50. Specifically, the first image display panel 20R is bonded to the first surface 50a of the cross dichroic prism 50 so that the long side 30a of the first display part 30R extends along the cross axis CX. The first image display panel 20R is held by the cross dichroic prism 50 so that the short side 30b of the first display part 30R extends along the Z direction. The first display part 30R and the first surface 50a of the cross dichroic prism 50 are attached through intermediation of an adhesive layer (not illustrated).

The second display part 30G is bonded to the second surface 50b so that the second image display panel 20G is held by the cross dichroic prism 50. Specifically, the second image display panel 20G is bonded to the second surface 50b of the cross dichroic prism 50 so that the long side 30a of the second display part 30G extends along the cross axis CX. The second image display panel 20G is held by the cross dichroic prism 50 so that the short side 30*b* of the second display part 30G extends along the X direction. The second display part 30G and the second surface 50*b* of the cross dichroic prism 50 are attached through intermediation of an adhesive layer (not illustrated).

As illustrated in FIG. 5, the third display part 30B is bonded to the third surface 50*c* so that the third image display panel 20B is held by the cross dichroic prism 50. In this exemplary embodiment, the third image display panel 20B is arranged so as to face the first image display panel 20R across the cross dichroic prism 50.

Specifically, the third image display panel 20B is bonded to the third surface 50*c* of the cross dichroic prism 50 so that the long side 30*a* of the third display part 30B extends along the cross axis CX. The third image display panel 20B is held by the cross dichroic prism 50 so that the short side 30*b* of the third display part 30B extends along the Z direction. The third display part 30B and the third surface 50*c* of the cross dichroic prism 50 are attached through intermediation of an adhesive layer (not illustrated).

Figure 6:
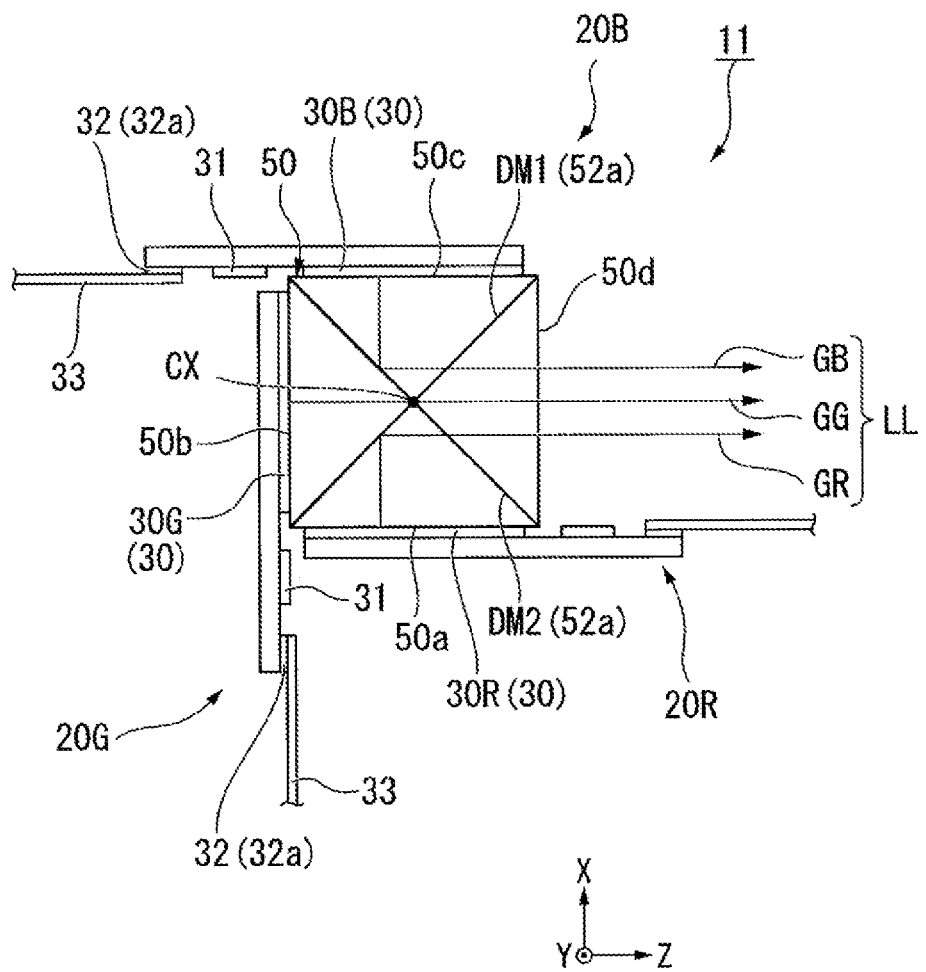
FIG. 6 is a side view of the image generating unit.

FIG. 6 is a side view of the image generating unit. FIG. 6 is a view of the image generating unit 11 as viewed in the direction along the cross axis CX (+Y direction).

As illustrated in FIG. 6, as viewed in the +Y direction in plan view, the first image display panel 20R is provided so as to extend past the cross dichroic prism 50 along the light emitting direction of the cross dichroic prism 50 (+Z direction).

Specifically, the first drive circuit part 31R and the first coupling part 32R of the first image display panel 20R are arranged on the outer side with respect to the first surface 50*a*. That is, in the first image display panel 20R, under a state in which the first drive circuit part 31R and the first coupling part 32R do not face the cross dichroic prism 50, only the first display part 30R is boned to the cross dichroic prism 50.

Further, when viewed in the +Y direction in plan view, the second image display panel 20G is provided so as to extend past the cross dichroic prism 50 along the −X direction being a direction crossing the light emitting direction (+Z direction).

Specifically, the second drive circuit part 31G and the second coupling part 32G of the second image display panel 20G are arranged on the outer side with respect to the second surface 50*b*. That is, in the second image display panel 20G, under a state in which the second drive circuit part 31G and the second coupling part 32G do not face the cross dichroic prism 50, only the second display part 30G is bonded to the cross dichroic prism 50.

As viewed in the +Y direction in plan view, the third image display panel 20B is provided so as to extend past the cross dichroic prism 50 along a direction opposite to the light emitting direction of the cross dichroic prism 50 (−Z direction).

Specifically, the third drive circuit part 31B and the third coupling part 32B of the third image display panel 20B are arranged on the outer side with respect to the third surface 50*c*. That is, the third image display panel 20B is bonded to the cross dichroic prism 50 under a state in which the third drive circuit part 31B and the third coupling part 32B are positioned on the outer side of the cross dichroic prism 50.

In the image generating unit 11 in this exemplary embodiment, the image display panels 20R, 20G, and 20B are bonded to the cross dichroic prism 50 so that the long sides 30*a* of the display parts 30 are adjacent to each other. As illustrated in FIG. 5, a size (volume) of the cross dichroic prism 50 is specified approximately with a product of the three sides (the long side 30*a*, the short side 30*b*, and the short side 30*b*).

Further, in the image generating unit 11 in this exemplary embodiment, the image display panels 20R, 20G, and 20B extend in the different directions on the outer side of the cross dichroic prism 50. That is, the exterior coupling substrates 33 coupled to the coupling parts 32 of the image display panels 20R, 20G, and 20B are drawn out from the cross dichroic prism 50 in the different directions. Thus, the image generating unit 11 in this exemplary embodiment can adopt a layout in which the exterior coupling substrates 33 are drawn out in the three different directions.

Further, in the image generating unit 11 in this exemplary embodiment, the width of the first image display panel 20R, the second image display panel 20G, and the third image display panel 20B is substantially equal to the width of the light emitting surface 50*d* of the cross dichroic prism 50 in the Y direction along the crossing axis CX. That is, in the image generating unit 11 in this exemplary embodiment, the image display panels 20R, 20G, and 20B do not protrude from the end surfaces of the cross dichroic prism 50 in the Y direction. Therefore, as illustrated in FIG. 5, a dimension H1 of the image generating unit 11 in the Y direction is defined only with the width of the cross dichroic prism 50.

Figure 7:
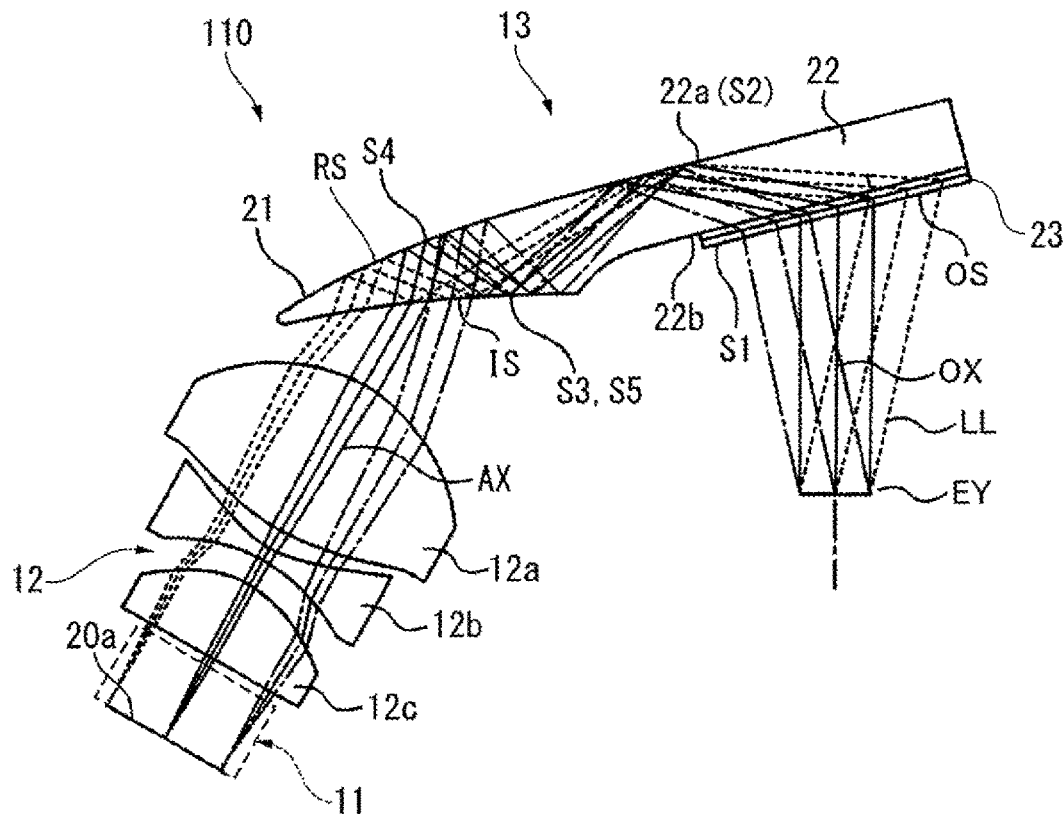
FIG. 7 is a diagram for illustrating main components of the image display unit and an optical path of image light.

FIG. 7 is a diagram for illustrating main components of the image display unit 110 and an optical path of the image light LL in this exemplary embodiment. Note that, in FIG. 7, an example in which the projection optical system 12 is formed of three lenses 12*a* to 12*c* is given.

The light-guiding optical system 13 is a light-guiding member or a light-guiding device configured to guide the image light LL from the projection optical system 12 to a space in front of the eyes the observer by internally reflecting and emitting the image light LL. The light-guiding optical system 13 includes an incidence part 21 for taking in the image light, a parallel light guide 22 for guiding the light, and an emitting part 23 for taking out the image light.

The incidence part 21 is arranged at the ear side of the observer, and the emitting part 23 is arranged at the nose side of the observer. The main bodies of the parallel light guide 22 and the incidence part 21 are molded into an integrated part or a single member by a resin material having high light transmissivity. Note that, the parallel light guide 22 is arranged so as to be inclined with respect to the light axis OX set with reference to the eyes EY of observer. With this, the parallel light guide 22 can be arranged along a curved line of the face. Further, the incidence part 21 and the parallel light guide 22 may be formed of separate members, and the members may be bonded with adhesive.

The incidence part 21 has a light incidence surface IS for taking in the image light LL from the projection optical system 12, and a reflection surface RS that reflects the image light LL that has been taken in and guides the image light inside the parallel light guide 22. The light incidence surface IS is formed by a convex curved surface at the projection optical system 12 side, and also has a function of totally reflecting, on the inner surface side, the image light LL reflected by the reflection surface RS. The reflection surface RS is formed by a convex curved surface at the projection optical system 12 side. The reflection surface RS is formed by performing film formation, such as aluminum evaporation on the curved surface, and configured to reflect the image light LL entering from the light incidence surface IS to bend the light path in a predetermined direction. The light incidence surface IS, at the inside, totally reflects the image light LL reflected by the reflection surface RS to bend the light path in a predetermined direction. Note that the curved surface forming each surface is a non-axisymmetric free curved surface, but is not limited thereto, and can be an axisymmetric free surface, a spherical surface, a non-spherical surface, or the like. Further, each curved surface can assist the collimation function by the projection optical system 12.

The parallel light guide 22 is a flat sheet portion, and has two planes 22a and 22b facing each other that form a pair of surfaces extending in parallel. Because both the planes 22a and 22b are parallel planes, the external image is not magnified, and a focus is not shifted. In the parallel light guide 22, one plane 22a functions as a total reflection surface that totally reflects the image light from the incidence part 21, and has a role of guiding, to the emitting part 23, the image light with a minimum loss. The plane 22b on the back side forms the boundary surface between the parallel light guide 22 and the emitting part 23. Note that, the image light may be reflected by forming a mirror coat or a half mirror film in an entire of a part of the planes 22a and 22b.

The emitting part 23 is a member that is formed in layers on an extension along the plane 22b at the back side, in a far side of the parallel light guide 22, that is, at the nose side of the observer, and includes a reflection unit formed by arranging a plurality of mirrors having transmissivity. As a result, the emitting part 23, while allowing the passage of the image light LL that is totally reflected in the plane 22a on the outer side forming the total reflection surface of the parallel light guide 22, reflects the incident image light LL at a predetermined angle to bend the incident image light to the light emitting surface OS side.

Note that each optical surface of the light-guiding optical system 13 on the light path is set as described below, sequentially from the downstream of the light path. First of all, the plane 22b of the parallel light guide 22 or the light emitting surface OS is set as a first surface S1, and the plane 22a is set as a second surface S2. Next, the light incidence surface IS of the incidence part 21 is set as a third surface S3 when viewed as a reflection surface through total reflection. In addition, the reflection surface RS of the incidence part 21 is set as a fourth surface S4. Finally, the light incidence surface IS is set as a fifth surface S5 when viewed as a surface that lets in light.

In the following, an operation of the HMD 300 and the detail configuration of the image generating unit 11 are described by following the order of the optical path of the image light LL. Note that, in the drawing, the light emitting surface 20a virtually illustrates the emission position of the image light LL synthesized in the image generating unit 11, and corresponds to the light emitting surface of the second image display panel 20G (see FIG. 3 and other figures).

First of all, the image light LL emitted from the light emitting surface 20a of the image generating unit 11 is emitted toward the light-guiding optical system 13 after passing through the projection optical system 12 formed by the three lenses 12a to 12c. The image light LL, upon entering from the fifth surface S5 of the light-guiding optical system 13, is reflected by the fourth surface S4, and in addition, upon being totally reflected on each of the third surface S3 and the second surface S2, reaches the first surface S1, and is emitted toward the eyes EY of the observer while being bent. That is, the image light LL reaches the eyes EY of the observer by being guided by the light-guiding optical system 13. When reaching the position of the eyes EY, each component of the image light LL is a parallelized bundle of rays, and enters by superpositioning at the position of the eyes EY. The observer identifies the image position by means of the incident direction or incident angle of light, and visually recognizes the virtual image. In this case, the cross-sectional shape of each bundle of rays superpositioned at the position of the eyes EY becomes the eye ring shape, and the diameter becomes the eye ring diameter. Here, the eye ring diameter indicates a size of an exit pupil formed in the vicinity of the pupil of the eye EY of the observer M by the image display unit 110.

Note that in the case of the above configuration, by providing a free curved surface on a part of the first surface S1 to the fifth surface S5, the load on the projection optical system 12 can be reduced, and as a result the optical system can be made thinner. Further, during the optical design, by following the light path in an order that is the reverse of the above, that is, in an order starting from the first surface S1 with the position of the eyes EY as the first reference, the settings of each part are made.

As a result of the configuration described above, the image light LL that is synthesized in the cross dichroic prism 50 forming the image generating unit 11 is securely guided to the eyes EY of the observer. The image light LL is visually recognized by the observer as a virtual image.

Figure 8:
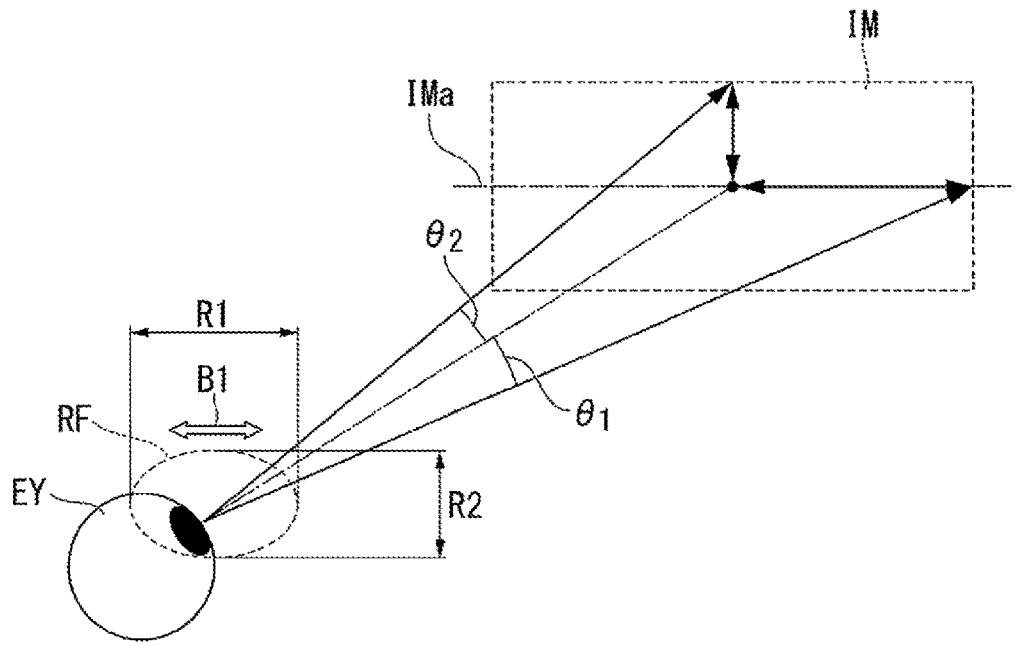
FIG. 8 is a diagram for schematically illustrating a virtual image visually recognized by an observer.

FIG. 8 is a diagram for schematically illustrating a virtual image visually recognized by the observer. In FIG. 8, a direction in which the right and left eyes of the observer are aligned is referred to as a direction B1.

As illustrated in FIG. 8, in the HMD 300 according to this exemplary embodiment, the image light LL is visually recognized by the observer as a virtual image IM. Generally, human eyes have a broader visual field in the lateral direction than the vertical direction. Therefore, in the HMD 300 according to this exemplary embodiment, the virtual image IM is laterally long by setting an angle of view $\theta_1$ in the lateral direction to be larger than an angle of view $\theta_2$ in the vertical direction. Note that, the crossing axis CX in the cross dichroic prism 50 corresponds to an imaginary axis IMa extending in a horizontal direction (lateral direction) on the virtual image IM. Further, the crossing axis CX corresponds to the direction B1 in which the right and left eyes of the observer are aligned.

Further, essentially, human eyes move often to the left and right, and the alignment of the left and right eyes varies from one individual to another. As a result of the reason described above, in order to ensure that images are not missed, that is, to enable light to reach the eyes, it is important to particularly increase the eye ring diameter of the image light in the lateral direction that is the direction of alignment of the eyes. That is, it can be said that, in the vertical direction that is the direction perpendicular to the direction of alignment of the eyes, the eye ring diameter is not as necessary as in the lateral direction.

In the HMD according to the present embodiment, an eye ring shape RF at the position of the eyes EY has a shape in which the direction B1 of alignment of the right and left eyes of the observer is the long axis direction. Specifically, as for the eye ring diameter of the eye ring shape RF, a diameter R1 in the direction B1 of alignment of the eyes EY is larger than a diameter R2 in the perpendicular direction. The eye ring shape RF is elliptical with the direction B1 of alignment of the eyes as the long axis direction, that is the eye ring shape RF is an elliptical shape which is longer in the lateral direction.

In FIG. 8, in a case where the ratio of diameter R2 to diameter R1 that correspond to the short side and the long side of the eye ring shape RF is set to approximately 1:2, for example, there is no loss of the laterally long image, and the variation in the pupil distance can also be handled. Moreover, by setting the eye ring shape RF to an elliptical shape, the size of each part of the mirror and other components that deflect the image in the direction of the eyes EY can be reduced.

In the HMD 300 according to this exemplary embodiment, divergence angles of the image light GR, GG, and GB, which are emitted from the image display panels 20R, 20G, and 20B, respectively, are adjusted so that the eye ring shape RF is formed into an elliptical shape and the virtual image IM is laterally long as described above.

Incidentally, in the HMD 300 according to this exemplary embodiment, it is required to adjust the divergence angles of the image light GR, GG, and GB while considering a reflection property of the dichroic films DM1 and DM2 of the cross dichroic prism 50.

In general, a dichroic film has incident angle dependency, and a reflection property is designed so that the incident light at 45 degrees is reflected efficiently. Also with regard to the dichroic films DM1 and DM2 in this exemplary embodiment, a component that enters at an incident angle far from 45 degrees may not be reflected at a reflection rate high enough to visually recognize a satisfactory image.

In the following, the incident angle dependency of the first dichroic film DM1 with respect to the red image light GR, which is emitted from the first image display panel 20R, is exemplified, but the same holds true to the incident angle dependency of the second dichroic film DM2 with respect to the blue image light GB, which is emitted from the third image display panel 20B.

Figure 9:
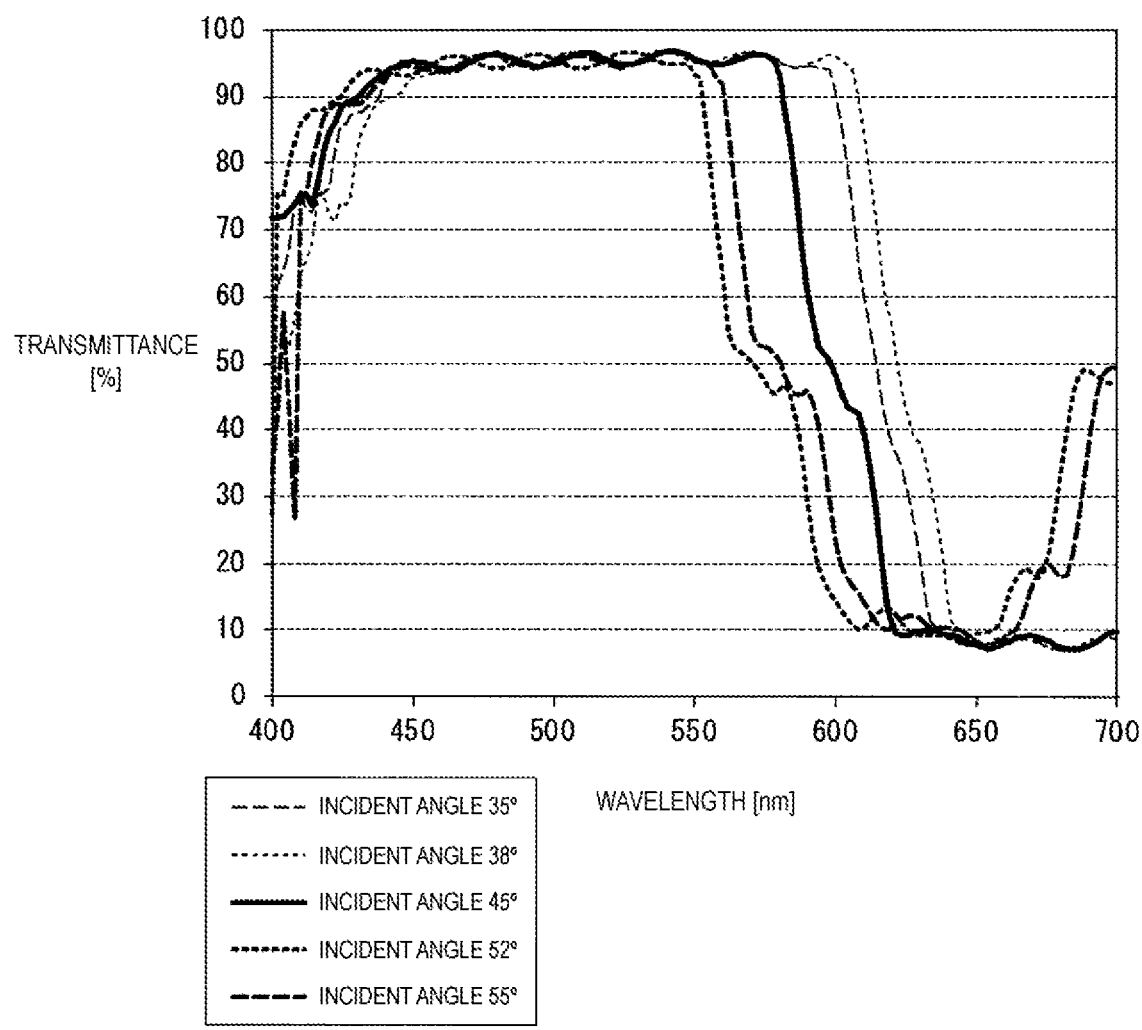
FIG. 9 is a graph for illustrating incident angle dependence of a first dichroic film.

FIG. 9 is a graph for illustrating the incident angle dependency of the first dichroic film DM1 with respect to the red image light GR, which is emitted from the first image display panel 20R. In the graph illustrated in FIG. 9, a horizontal axis indicates a wavelength of incident light (unit: nm), and a vertical axis indicates a reflection ratio of the incident light (unit: %). In FIG. 9, five curved lines indicating a reflection property at incident angles of 35 degrees, 38 degrees, 45 degrees, 52 degrees, and 55 degrees are illustrated.

As illustrated in FIG. 9, it is apparent that the reflection property of the first dichroic film DM1 changes largely depending on the incident angle of the light entering the first dichroic film DM1.

In the HMD 300 according to this exemplary embodiment, the red image light GR, which is emitted from the first image display panel 20R, enters the first dichroic film DM1 arranged to be inclined at 45 degrees. Here, a divergence angle α determines an angle of view in a horizontal direction of the virtual image IM of the red image light GR (the right-and-left direction in FIG. 9), that is, the direction along the crossing axis CX of the red image light GR, and a divergence angle β determines an angle of view in a vertical direction of the virtual image IM of the red image light GR (the up-and-down direction in FIG. 9), that is, the direction orthogonal to the crossing axis CX of the red image light GR.

In this exemplary embodiment, as described above, the laterally long virtual image IM is generated along the crossing axis CX, and hence the divergence angle β is smaller than the divergence angle α. Specifically, in this exemplary embodiment, the divergence angle α is suppressed to be 10 degrees, and the divergence angle β is suppressed to be 7 degrees.

In the first dichroic film DM1, largeness of the divergence angle β directly affects the red image light GR with a difference of the divergence angle β as an incident angle difference. That is, the red image light GR enters the first dichroic film DM1 at an angle range of 45 degrees ±β, and hence is largely affected by the incident angle dependency described above.

In contrast, in the first dichroic film DM1, a largeness of the divergence angle α is less liable to affect the red image light GR reflected on the first dichroic film DM1.

In the HMD 300 according to this exemplary embodiment, in the first dichroic film DM1, the divergence angle α, which is less affected by the incident angle dependency, is set to be relatively larger at 10 degrees. In the first dichroic film DM1, the divergence angle β, which is more affected by the incident angle dependency, is set to be relatively smaller at 7 degrees.

With this, the eye ring shape RF having an elliptical shape as illustrated in FIG. 9 is achieved, and influence of the incident angle dependency in the first dichroic film DM1 is suppressed. As a result, a high reflection and transmission property is maintained, and the bright red image light GR can be generated efficiently. Thus, the observer can visually recognize the red image light GR as a bright virtual image without a defect of an image.

Note that, in addition to the divergence angle α that determines an angle of view in the direction along the cross axis CX and the divergence angle β that determines an angle of view in the direction perpendicular to the cross axis CX as described above, it is necessary to take into consideration the components of light proceeding in an inclined direction including both the components. However, the inclination of the components with respect to the dichroic films DM1 and DM2 does not vary greatly from the inclination in the direction perpendicular to the cross axis CX. This is because, while the angle of divergence in the direction perpendicular to the cross axis CX is either added to subtracted from the reference 45 degrees, the angle of divergence in the direction parallel to the cross axis CX has almost no influence on the incident angle.

Therefore, in consideration of the range of the divergence angle in the direction perpendicular to the cross axis CX, for example, by providing a slight margin hereto, the dichroic films DM1 and DM2 having a desired transmission and reflection property can be formed.

Further, the same holds true to the incident angle dependency of the second dichroic film DM2 with respect to the blue image light GB. That is, in the HMD 300 according to this exemplary embodiment, the blue image light GB, which is emitted from the third image display panel 20B, enters the second dichroic film DM2 arranged to be inclined at 45 degrees. The divergence angle of the blue image light GB, which determines an angle of view in the direction along the cross axis CX, is larger than the divergence angle of the blue image light GB, which determines an angle of view in the direction perpendicular to the cross axis CX.

With this, the eye ring shape RF having an elliptical shape as illustrated in FIG. 9 is achieved, and influence of the incident angle dependency in the second dichroic film DM2 is suppressed. As a result, a high reflection and transmission property is maintained, and the bright blue image light GB can be generated efficiently. Thus, the observer can visually recognize the blue image light GB as a bright virtual image without a defect of an image.

Further, the green image light GG that transmits the dichroic films DM1 and DM2 is less liable to be affected by the incident angle dependency of the dichroic films DM1 and DM2. Therefore, the observer can visually recognize the green image light GG as a bright virtual image without a defect of an image.

Further, in general, the HMD mounted on the head of the observer is required to be compact and light-weighted as much as possible. Regarding this point, the HMD 300 according to this exemplary embodiment is reduced in size and weight.

Figure 10:
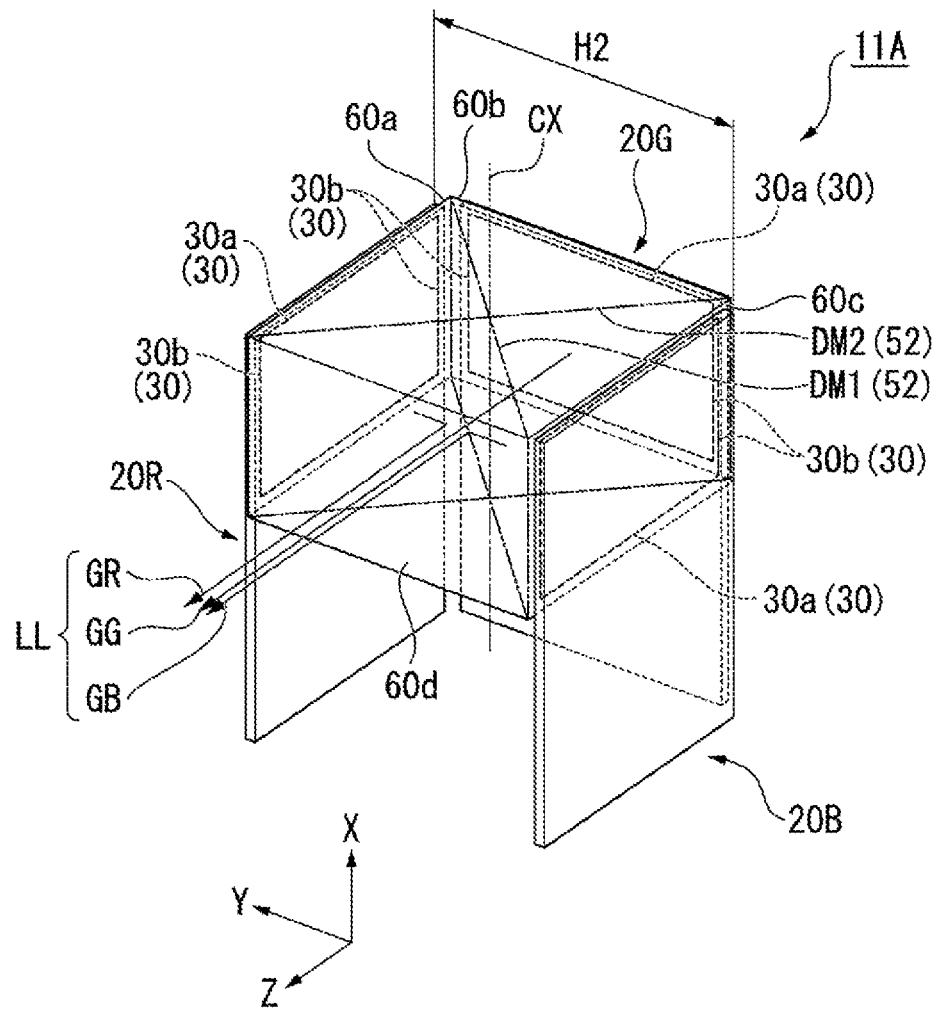
FIG. 10 is a perspective view for illustrating a configuration of an image generating unit in a comparative example.

Here, with reference to a comparative example illustrated in FIG. 10, a size and weight of the image generating unit 11 in this exemplary embodiment are described. FIG. 10 is a perspective view for illustrating a configuration of an image generating unit in the comparative example. Note that, in FIG. 10, the configurations of the image display panels 20R, 20G, and 20B are illustrated in a simple manner.

Note that, the image generating unit 11A in the comparative example illustrated in FIG. 10 is different from the image generating unit 11 in this exemplary embodiment in a direction of bonding the image display panels 20R, 20G, and 20B with respect to the cross axis CX of a cross dichroic prism 60, and other matters are common with each other. Therefore, in the following, a difference in a direction of bonding the image display panels 20R, 20G, and 20B to the cross axis CX is mainly described.

As illustrated in FIG. 10, in the image generating unit 11A in the comparative example, the first image display panel 20R is bonded to a first surface 60*a* of the cross dichroic prism 60 so that the short side 30*b* of the first display part 30R extends along the cross axis CX. Further, the second image display panel 20G is bonded to a second surface 60*b* of the cross dichroic prism 60 so that the short side 30*b* of the second display part 30G extends along the cross axis CX. Similarly, the third image display panel 20B is bonded to a third surface 60*c* of the cross dichroic prism 60 so that the short side 30*b* of the third display part 30B extends along the cross axis CX.

In the image generating unit 11A in the comparative example, the cross axis CX extends along the X direction, the image light LL is emitted in the Z direction, and the long side 30*a* of each of the display parts 30 extends along the Y direction. Note that, an XYZ coordinate system of the image generating unit 11A in the comparative example in FIG. 10 corresponds to the XYZ coordinate system of the image generating unit 11 in FIG. 5.

In the image generating unit 11A in the comparative example, the image display panels 20R, 20G, and 20B are bonded to the cross dichroic prism 50 so that the short sides 30*b* of the display parts 30 are adjacent to each other. The size (volume) of the cross dichroic prism 60 is specified approximately with a product of the three sides (the long side 30*a*, the long side 30*a*, and the short side 30*b*). That is, the cross dichroic prism 60 of the image generating unit 11A in the comparative example is larger than the cross dichroic prism 50 of the image generating unit 11, which is defined by the product of the three sides (the long side 30*a*, the short side 30*b*, and the short side 30*b*).

Further, in the image generating unit 11A in the comparative example, the first image display panel 20R and the third image display panel 20B are respectively bonded to the first surface 60*a* and the third surface 60*c* perpendicular to the Y direction. Therefore, a dimension H2 of the image generating unit 11A in the comparative example in the Y direction is defined as a width obtained by adding the cross dichroic prism 60, the first image display panel 20R, and the third image display panel 20B.

The dimension H1 of the image generating unit 11 in this exemplary embodiment in the Y direction is defined only with the width of the cross dichroic prism 60 as illustrated in FIG. 5. In contrast, the dimension H2 of the image generating unit 11A in the comparative example in the Y direction is increased by a thickness of the first image display panel 20R and the third image display panel 20B as illustrated in FIG. 7.

Therefore, with the image generating unit 11 in this exemplary embodiment, the dimension H1 in the Y direction can be reduced in size as compared to the image generating unit 11A in the comparative example. Thus, a dimension of the space to which the image generating unit 11 is mounted is reduced in the predetermined direction (Y direction), and hence the image display unit 110 in this exemplary embodiment can be reduced in outer shape in the predetermined direction (Y direction).

The image display unit 110 in this exemplary embodiment is reduced in dimension in the Y direction of being away from the surface of the face of the observer M, and hence the shape along the face of the observer M can be adopted. With this, the HMD 300, which is reduced in size and excellent in design, can be provided.

Further, with the image display unit 110 in this exemplary embodiment, the cross dichroic prism 50 can be reduced in size as compared to the image generating unit 11A in the comparative example. The cross dichroic prism 50 is formed of a translucent member such as glass, and hence size reduction enables significant weight reduction. Therefore, with the image display unit 110 in this exemplary embodiment, the cross dichroic prism 50 can be reduced in size, and hence weight reduction can be achieved as compared to the case in which the image generating unit 11A in the comparative example is adopted. Thus, the HMD 300 according to this exemplary embodiment includes the image display unit 110, and hence the device configuration can be reduced in size and weight.

Second Exemplary Embodiment

Next, an image generating unit in a second exemplary embodiment is described. The image generating unit in this exemplary embodiment is different from the image generating unit 11 in the first exemplary embodiment in a method of bonding the image display panels 20R, 20G, and 20B, and other configurations are common with each other. Therefore, in the following, common members and configurations are denoted with the same reference symbols, and detail description therefor is omitted.

Figure 11:
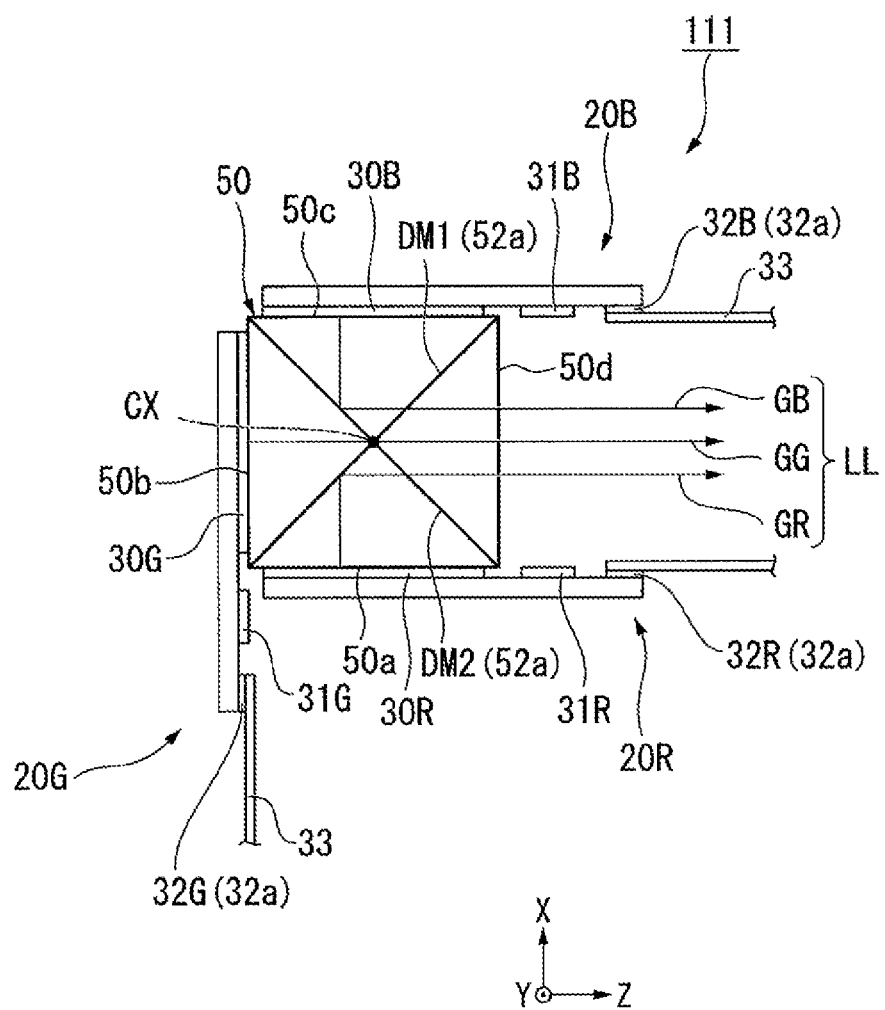
FIG. 11 is a perspective view for illustrating an image generating unit according to a second exemplary embodiment.

FIG. 11 is a perspective view for illustrating the image generating unit according to the second exemplary embodiment. Note that, FIG. 11 is a view corresponding to FIG. 6 in the first exemplary embodiment.

As illustrated in FIG. 11, as viewed in the +Y direction in plan view, the first image display panel 20R in the second exemplary embodiment is provided so as to extend past the cross dichroic prism 50 along the light emitting direction of the cross dichroic prism 50 (+Z direction).

The first drive circuit part 31R and the first coupling part 32R of the first image display panel 20R are arranged on the outer side with respect to the first surface 50*a*. That is, the first image display panel 20R is boned to the cross dichroic prism 50 under a state in which the first drive circuit part 31R and the first coupling part 32R do not face the cross dichroic prism 50.

When viewed in the +Y direction in plan view, the second image display panel 20G is provided so as to extend past the cross dichroic prism 50 along the −X direction being a direction crossing the light emitting direction the light emitting direction (+Z direction).

The second drive circuit part 31G and the second coupling part 32G of the second image display panel 20G are arranged on the outer side with respect to the second surface 50*b*. That is, the second image display panel 20G is bonded to the cross dichroic prism 50 under a state in which the second drive circuit part 31G and the second coupling part 32G do not face the cross dichroic prism 50.

As viewed in the +Y direction in plan view, the third image display panel 20B in the second exemplary embodiment is provided so as to extend past the cross dichroic prism 50 along the light emitting direction of the cross dichroic prism 50 (+Z direction). That is, in the second exemplary embodiment, the first image display panel 20R and the third image display panel 20B are bonded to the cross dichroic prism 50 under a state of extending in the same direction (+Z direction).

Also in the image generating unit 111 in the second exemplary embodiment, the image display panels 20R, 20G, and 20B are bonded to the cross dichroic prism 50 so that the long sides 30*a* of the display parts 30 are adjacent to each other. Therefore, the size (volume) of the cross dichroic prism 50 is specified approximately with a product of the three sides (the long side 30*a*, the short side 30*b*, and the short side 30*b*).

In the image generating unit 111 in the second exemplary embodiment, the exterior coupling substrates 33 coupled to the coupling parts 32R and 32B of the image display panels 20R and 20B are drawn out from the cross dichroic prism 50 in the same direction.

Further, also in the image generating unit 111 of the second exemplary embodiment, the image display panels 20R, 20G, and 20B do not protrude from the end surfaces of the cross dichroic prism 50 in the Y direction. Thus, the dimension of the image generating unit 111 in the Y direction is a width of the cross dichroic prism 50.

With the image generating unit 111 in this exemplary embodiment, similar effects to the image generating unit 11 in the first exemplary embodiment can be exerted. That is, as compared to the image generating unit 11A in the comparative example described above, the dimension H1 in the Y direction can be reduced. Thus, also in the image display unit 110 in this exemplary embodiment, an outer shape in a predetermined direction (Y direction) can be reduced. Further, according to the image display unit including the image generating unit 111 in this exemplary embodiment, as compared to the image generating unit 11A in the comparative example, weight reduction can be achieved by reducing the cross dichroic prism 50 in size. Thus, also in the HMD according to this exemplary embodiment, the device configuration can be reduced in size and weight.

Note that the technical scope of the present disclosure is not limited to the above-described exemplary embodiments, and various modifications can be made to the above-described exemplary embodiments without departing from the spirit and gist of the present disclosure.

For example, the eye ring has a laterally long elliptical shape, but the shape is not limited thereto, and various shapes in which the direction of alignment of the eyes of the observer is the long axis direction can be set.

Further, in the exemplary embodiments described above, in the image generating units 11 and 111, an elliptical-shaped eye ring is formed by guiding the image light LL while maintaining the relationship of the divergence angles at the light emission side, but the present disclosure is not limited thereto. In the image generating units 11 and 111, for example, by adjusting the shape of the aperture provided at the focal point, the shape of the eye ring obtained in the end may be determined.

In the description above, the configuration is such that the HMD is provided as one set each corresponding to both the right eye and the left eye, but the HMD may be provided only for either one of the right eye and the left eye to view an image with one eye.

Further, in the description above, the parallel light guide 22 is laterally long, and the light incidence surface IS is formed to be positioned at the outer side of the lateral direction of the eyes, but as long as the image light LL can be appropriately guided into the light-guiding optical system 13, the position of the light incidence surface IS is not limited thereto. For example, the light incidence surface IS may be provided in a part of the upper end surface or the lower end surface at the top or the bottom of the light-guiding optical system 13.

In the description above, the example in which the coupling part 32 is provided adjacent to the display part 30 in each of the image display panels 20R, 20G, and 20B is given. However, the coupling 32 may be arranged dispersedly in a periphery of the display part 30, or may be arranged on a back surface of each panel, which is a surface opposite to the mounting surface of the display part 30.

What is claimed is:

1. An optical module comprising:
   a first image display panel including:
      a first display part having a rectangular shape; and
      a first coupling part;
   a second image display panel including:
      a second display part having a rectangular shape; and
      a second coupling part;
   a third image display panel including:
      a third display part having a rectangular shape; and
      a third coupling part; and
   a cross dichroic prism including a two of photosynthesis surfaces, and configured to synthesize first image light emitted from the first image display panel, second image light emitted from the second image display panel, and third image light emitted from the third image display panel,
   wherein the cross dichroic prism has a cross axis at which the two of photosynthesis surfaces cross each other, and
   the first image display panel, the second image display panel, and the third image display panel are respectively bonded to different surfaces of the cross dichroic prism in a state where a long side of each of the first display part, the second display part, and the third display part extends along the cross axis and the first coupling part, the second coupling part, and the third coupling part are each positioned on an outer side of the cross dichroic prism.

2. The optical module according to claim 1, wherein
   the first image display panel and the third image display panel are arranged to face each other across the cross dichroic prism and
   when viewed from a direction along the cross axis in plan view, the first image display panel is provided to extend past the cross dichroic prism along a light emitting direction of the cross dichroic prism, the third image display panel is provided to extend past the cross dichroic prism along a direction opposite to the light emitting direction, and the second image display panel is provided to extend past the cross dichroic prism along a direction crossing the light emitting direction.

3. The optical module according to claim 1, wherein
   the first image display panel and the third image display panel are arranged to face each other across the cross dichroic prism and
   when viewed from a direction along the cross axis in plan view, the first image display panel and the third image display panel are each provided to extend past the cross dichroic prism along a light emitting direction of the cross dichroic prism, and the second image display panel is provided to extend past the cross dichroic prism along a direction crossing the light emitting direction.

4. The optical module according to claim 1, wherein the first image display panel further includes a first drive circuit part configured to drive the first display part,
the second image display panel further includes a second drive circuit part configured to drive the second display part,
the third image display panel further includes a third drive circuit part configured to drive the third display part, and
the first image display panel, the second image display panel, and the third image display panel are respectively bonded to different surfaces of the cross dichroic prism in a state where the first drive circuit part, the second drive circuit part, and the third drive circuit part are each positioned on the outer side of the cross dichroic prism.

5. The optical module according to claim 1, wherein the plurality of image display panels are light emitting panels.

6. The optical module according to claim 5, wherein the light emitting panels are organic EL panels.

7. A head-mounted display apparatus comprising:
the optical module according to claim 1; and
a projection optical system configured to project light from the optical module to an eye of an observer.

8. An optical module comprising:
a first image display panel including:
 a first display part having a rectangular shape; and
 a first coupling part;
a second image display panel including:
 a second display part having a rectangular shape; and
 a second coupling part;
a third image display panel including:
 a third display part having a rectangular shape; and
 a third coupling part; and
a cross dichroic prism including a two of photosynthesis surfaces, and configured to synthesize first image light emitted from the first image display panel, second image light emitted from the second image display panel, and third image light emitted from the third image display panel,
wherein the cross dichroic prism has a cross axis at which the two of photosynthesis surfaces cross each other, and
the first image display panel, the second image display panel, and the third image display panel are respectively bonded to different surfaces of the cross dichroic prism,
the first image display panel is arranged so that a long side of the first display part extends along the cross axis and the first coupling part do not face the cross dichroic prism,
the second image display panel is arranged so that a long side of the second display part extends along the cross axis and the second coupling part do not face the cross dichroic prism, and
the third image display panel is arranged so that a long side of the third display part extends along the cross axis and the third coupling part do not face the cross dichroic prism.

* * * * *